United States Patent
Krogmeier et al.

(10) Patent No.: US 6,533,025 B1
(45) Date of Patent: Mar. 18, 2003

(54) INSTRUMENTAL PANEL SUPPORT

(75) Inventors: Jürgen Krogmeier, Hövelhof (DE); Andreas Hitz, Erwitte (DE); Rafael Carcia, Paderborn (DE); Wulf Härtel, Altenbeken (DE)

(73) Assignee: Benteler AG, Paderborn (DE)

( * ) Notice: Subject to any disclaimer, the term of this patent is extended or adjusted under 35 U.S.C. 154(b) by 32 days.

(21) Appl. No.: 09/587,594

(22) Filed: Jun. 5, 2000

(30) Foreign Application Priority Data

Apr. 22, 2000 (EP) .......................................... 00108735

(51) Int. Cl.$^7$ .................... B60K 37/04; B60H 1/24; B62D 25/14; B62D 25/08
(52) U.S. Cl. ........................ 165/41; 165/42; 165/43; 454/121; 454/127; 296/208; 296/192; 296/194; 296/197; 180/90; 237/12.3 A; 237/12.3 B
(58) Field of Search .......................... 165/156, 41, 42, 165/43; 454/121, 126, 156, 127; 296/208, 192, 194, 197; 180/90; 237/12.3 A, 12.3 B

(56) References Cited

U.S. PATENT DOCUMENTS

| | | | | |
|---|---|---|---|---|
| 2,718,037 A | * | 9/1955 | Lintern | 454/121 |
| 3,174,538 A | * | 3/1965 | Nallinger | |
| 3,278,121 A | * | 10/1966 | Komenda | 454/127 |
| 3,289,564 A | * | 12/1966 | Castelet | 454/127 |
| 3,301,161 A | * | 1/1967 | Attwood et al. | 454/127 |
| 3,327,603 A | * | 6/1967 | Castelet | 454/127 |
| 4,223,754 A | * | 9/1980 | Mizuno et al. | 454/127 |
| 4,582,156 A | * | 4/1986 | Kochy et al. | 180/90 |
| 4,597,461 A | * | 7/1986 | Kochy et al. | 180/90 |
| 5,082,078 A | * | 1/1992 | Umeda et al. | 180/90 |
| 5,354,114 A | * | 10/1994 | Kelman et al. | 296/208 |
| 5,358,300 A | * | 10/1994 | Gray | 296/208 |
| 5,556,153 A | * | 9/1996 | Kelman et al. | 180/90 |
| 5,709,601 A | * | 1/1998 | Heck | 454/121 |
| 6,227,611 B1 | * | 5/2001 | Dauvergne | 454/121 |
| 6,273,495 B1 | * | 8/2001 | Haba et al. | 296/208 |

FOREIGN PATENT DOCUMENTS

| | | | |
|---|---|---|---|
| DE | 196 20 919 A1 | 11/1997 | |
| DE | 299 16 467 U1 | 1/2000 | |
| FR | 1177397 | * 4/1959 | 165/156 |
| FR | 2539498 | * 7/1984 | 165/156 |
| GB | 1042037 | * 9/1966 | 454/127 |
| JP | 63-38016 | * 2/1988 | 454/127 |
| JP | 10-44762 | * 2/1998 | |
| JP | 11-115550 | * 4/1999 | |
| JP | 11-227453 | * 8/1999 | |

* cited by examiner

Primary Examiner—John K. Ford
(74) Attorney, Agent, or Firm—Friedrich Kueffner

(57) ABSTRACT

An instrument panel support, positioned between A columns of a motor vehicle, has a profiled support member with an integrated air guide system. The profiled support member has at least one air inlet and at least one air outlet connected to the air guide system. The air guide system forms at least a portion of a heat exchanger of an air conditioner of the motor vehicle. Preferably, at least one heat exchanger conduit is integrated into the air guide system.

1 Claim, 4 Drawing Sheets

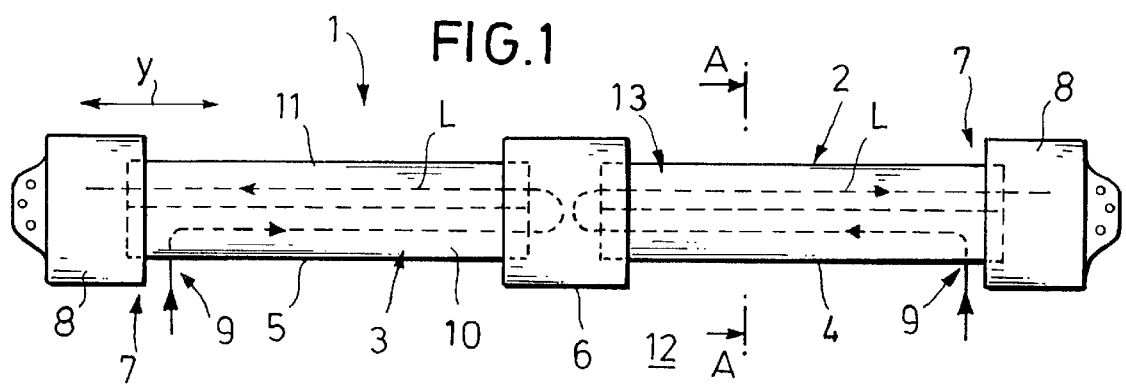
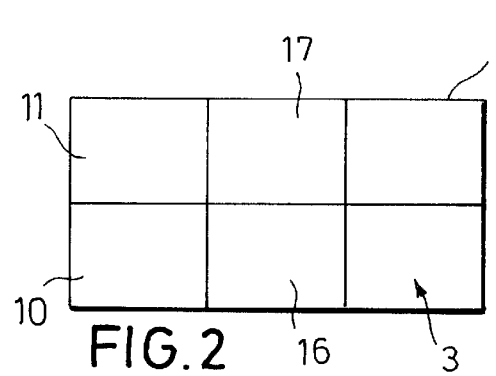
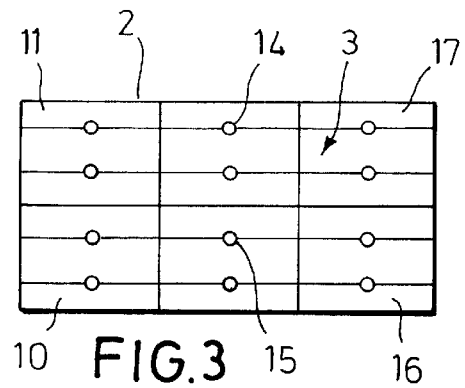
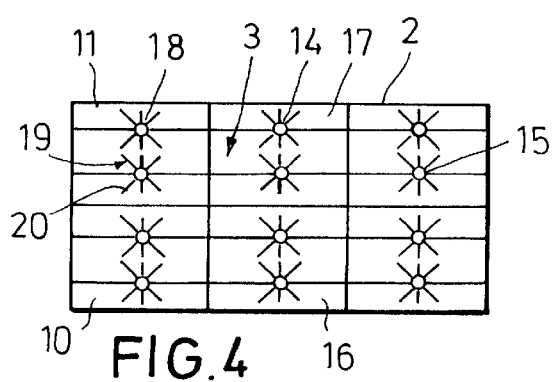
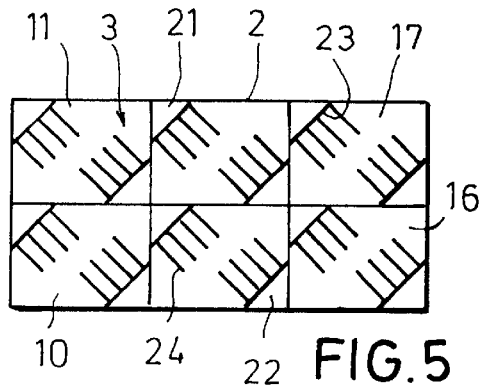
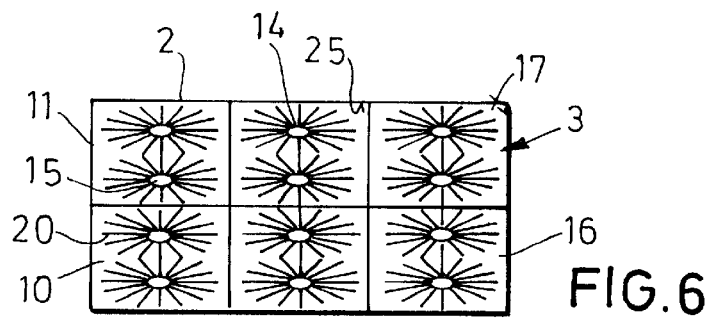

INSTRUMENTAL PANEL SUPPORT

BACKGROUND OF THE INVENTION

1. Field of the Invention

The invention relates to an instrument panel support for a passenger car, extending between the A columns of the passenger car and comprising a profiled support member with integrated air guide system, wherein the profiled support member has at least one air inlet and at least one air outlet.

2. Description of the Related Art

Instrument panel supports in passenger cars extend between the A columns in a direction transverse to the travel direction. In conventional construction, an instrument panel support is comprised essentially of a profiled support member, for example, a tube, as is disclosed in German patent document 196 20 919 A1. In the area of the cockpit, various holders are arranged on the instrument panel support for the instrument panel itself as well as for securing or fastening further vehicle components such as heating and air conditioning devices, airbag, steering column, center console, fuse box, glove box.

In the known configuration, the instrument panel is comprised of at least two components arranged about the instrument panel support which are formed as foamed shaped plastic parts. They have recesses for receiving components to be inserted, in particular, the components of the heating or air conditioning device. Moreover, the instrument panel has air guide systems wherein the air is guided via air inlets in the area of the center console to air outlets in the area of the driver and passenger portions of the instrument panel as well as the windshield and side window panes. Despite this compact configuration the instrument panel requires a comparatively large mounting space.

An instrument panel support of the prior art is disclosed in German patent document 299 16 467 and is comprised of a profiled support member with integrated air guide system. The profiled support member is divided into two at least indirectly connected longitudinal portions which are adjusted with regard to their configuration and their material to the load situation on the driver side and the passenger side. In this way, the rigidity of the instrument panel support can be improved while a lightweight and simple configuration is provided.

In principle, the instrument panel support must fulfill various functions. In addition to bracing the car body for energy absorption during a crash, it serves to connect different spatial points and to secure various holders. Moreover, it must be suitable for operation within different frequency ranges.

SUMMARY OF THE INVENTION

It is an object of the present invention, desiring an innovative further development of motor vehicle concepts based on the prior art, to improve an instrument panel support with respect to its function so that space is gained in the cockpit area of a passenger car and the passenger comfort is increased.

In accordance with the present invention, this is achieved in that the air guide system forms at least a portion of the heat exchanger of the air conditioner of the passenger car.

The heart of the invention is the measure that the air guide system of the profiled support member forms at least a portion of the heat exchanger of the air conditioner of the passenger car. The complete heat exchanger, or at least components thereof, such as heat exchanger conduits and related components (for example, fan), are integrated according to the invention into the air guide system within the profiled support member of the instrument panel support.

By moving the heat exchanger, or components thereof, into the instrument panel support, the available space within the leg room area for the driver as well as the passenger is increased. Moreover, a separate heating and air conditioning of the driver and passenger sides can be realized in a technically advantageous manner. Air guiding, cooling, and heating are combined into a complex configuration within the profiled support member.

According to a preferred embodiment of the invention, the air guide system has integrated therein at least one heat exchanger conduit which carries heat exchanger medium.

Expediently, the air guide system is divided into several longitudinal channels into which heat exchanger conduits are integrated. In this manner, different variants for integration of cooling medium conduits and heating water conduits are possible. The configuration can be realized according to the respective models and can be adjusted with respect to the available mounting space.

An increase of the heat exchanger efficiency can be achieved in that the heat exchanger conduits are provided with heat exchanger surfaces so that their surface area is enlarged. Conceivable are, for example, ribs or lamellas which project into the air flow space of the air guide system. This increases the heat transfer surface area so that an efficient heat exchange is ensured. The heat exchange surfaces (ribs, lamellas) can also be used for bracing or stiffening the heat exchanger conduit in the profiled support member.

Preferably, the support member is divided into two longitudinal portions which are connected to one another by a coupling member. By means of the central coupling member, the air can be distributed and guided into different planes or segments of the air guide system within the support member.

The profiled support member is coupled to the A columns so as to be relatively movable with respect to the A columns. This allows a tolerance compensation of the instrument panel support relative to the A columns within the front arrangement of the cockpit. This configuration especially allows a compensation in the longitudinal direction of the profiled support member. In this context, an especially advantageous embodiment provides that the ends of the profiled support member are position-oriented but moveable relative to the A columns in holders of the A columns with interposition of seals.

For ensuring a long contact time of the air with the effective heat exchange surfaces within the air guide system, it is provided that the air guide system has means for generating a spiral air flow about the heat exchanger conduit (s). This measure contributes to an efficiency increase of the heat transfer.

According to another advantageous embodiment, the air guide system has a condensate discharge. This condensate discharge allows removal of collected condensed water.

Expedient is furthermore an anti-bacterial coating of the surfaces participating in the heat exchange and the air guiding action in order to counteract a deposition of bacteria on these surfaces and to avoid their introduction into the passenger compartment.

BRIEF DESCRIPTION OF THE DRAWING

In the drawing:

FIG. 1 is a view of a first embodiment of an instrument panel support according to the invention with a dual circuit air distribution configuration;

FIGS. 2–6 show five cross-sectional illustrations of an instrument panel support according to FIG. 1 along section line A—A illustrating the different configurations;

DESCRIPTION OF THE PREFERRED EMBODIMENTS

Figure 7:
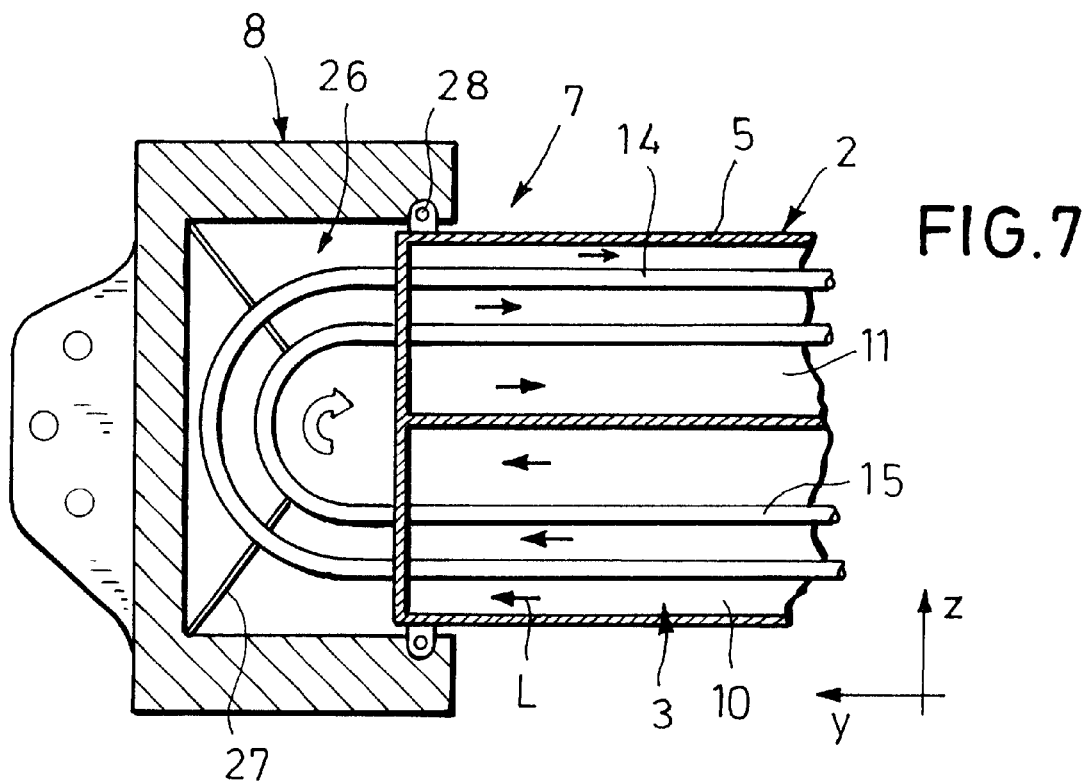
FIG. 7 is a sectional illustration of the end of the profiled support member including the illustration of a holder of the A column.

Components that correspond to one another have the same reference numerals in all drawings.

In FIG. 1 a symmetric instrument panel support 1 is illustrated which has a dual circuit air distribution configuration with integrated cooling and heating. The instrument panel support 1 extends within a passenger car between the A columns (not shown) in a direction transverse to the travel direction.

The instrument panel support 1 comprises a profiled support member 2 with integrated air guide system 3. The profiled support member 2 is divided into two longitudinal portions 4, 5 which are connected to one another by a central coupling member 6. The ends 7 of the longitudinal portions 4, 5 are integrated in holders 8 of the A columns so as to be relatively movable to the holders 8 (see also FIG. 7). The air and the air flow are indicated by arrows L. The air enters the air guide system 3 via air inlets 9, flows through a first longitudinal channel 10 to the coupling member 6 where the air flow L is deflected and returned via a second longitudinal channel 11 in the direction toward the holder 8 of the A column. The air which has been air-conditioned on its path through the air guide system 3 will flow through air outlets (not shown) into the passenger compartment 12.

The air guide system 3 forms at least a portion of the heat exchanger 13 of the air conditioner of the passenger car. When looking at FIGS. 1 and 7, it becomes clear that for this purpose heat exchanger conduits 14, 15, which carry a heat exchanger medium, are integrated into the air guide system 3. By means of these heat exchanger conduits 14, 15, the air L can be air-conditioned, i.e., can be cooled or heated, on its path through the air guide system 3 within the profiled support member 2.

By moving components of the air conditioner from the leg room of the passenger car into the instrument panel support 1, the leg room can be enlarged or the thus gained mounting space can be used for other vehicle components.

The FIGS. 2 through 6 show cross-sectional views of different embodiments of the air guide system 3 and heat exchanger conduits 14, 15 arranged therein.

FIG. 2 shows a profiled support member 2 in which the air guide system 3 is divided into several longitudinal channels 10, 11; 16, 17 arranged atop and adjacent to one another. The air L can be guided through the longitudinal channels 10, 11; 16, 17 in a step-wise or cascade-like manner. The longitudinal channels 10, 11; 16, 17 receive the heat exchanger conduits 14, 15, as represented in FIGS. 3 through 6, wherein a heat exchanger conduit 14 is provided for a cooling medium and a heat exchanger conduit 15 is provided for guiding water for heating purposes.

FIG. 3 shows the embodiment of a profiled support member 2 having heat exchanger conduits 14, 15 in the form of smooth pipes integrated in the air guide system 3. In the variant according to FIG. 4 the heat exchanger conduits 14, 15 have surface-area enlarging heat exchange surfaces 19 in the form of longitudinal ribs 20 or lamellas arranged on the outer circumference of their outer surface 18.

In the profiled support member represented in FIG. 5 the heat exchanger conduits 21, 22 are positioned diametrically opposite one another in the corners of the air guide system 3. The heat exchanger conduits 21, 22 are separated from the air guide system 3 by partitions 23, integrated in the longitudinal direction into the air guide system 3. Radially oriented ribs 24 project from the partitions 23.

FIG. 6 illustrates a star-shaped profile of the heat exchanger conduits 14, 15 wherein the heat exchanger conduits 14, 15 are supported on one another and on the inner walls 25 of the air channels 10, 11; 16, 17. This provides bracing of the profiles.

The illustration of FIG. 7 shows that the ends 7 of the profiled support member 2 are supported in the holders 8 of the A columns so as to be relatively movable to the A columns.

The longitudinal channels 10, 11 of the air guide system 3 and their integrated heat exchanger conduits 14, 15 can be seen. The heat exchanger conduit 14 carries a cooling medium; the heat exchanger conduit 15 is a part of the heating water circuit. The flow of air in the air guide system 3 is illustrated by arrows L. The heat exchanger conduits 14, 15 as well as the air L are deflected from the lower longitudinal channel 10 into the upper longitudinal channel 11 in a distributor chamber 26 of the holder 8 of the A column. In the distributor chamber 26 the heat exchanger conduits 14, 15 are position-oriented by securing stays 27.

It is also shown that the end 7 of the profiled support member 2 is integrated into the holder 8 of the A column with interposition of a circumferential seal 28. In this way, penetration of air to the exterior is prevented and, at the same time, a relative movement of the profiled support member 2 within the holder 8 of the A column is made possible. In this way, a tolerance compensation of the profiled support member 2 in the y-direction is possible (see also FIG. 1).

Figure 8:
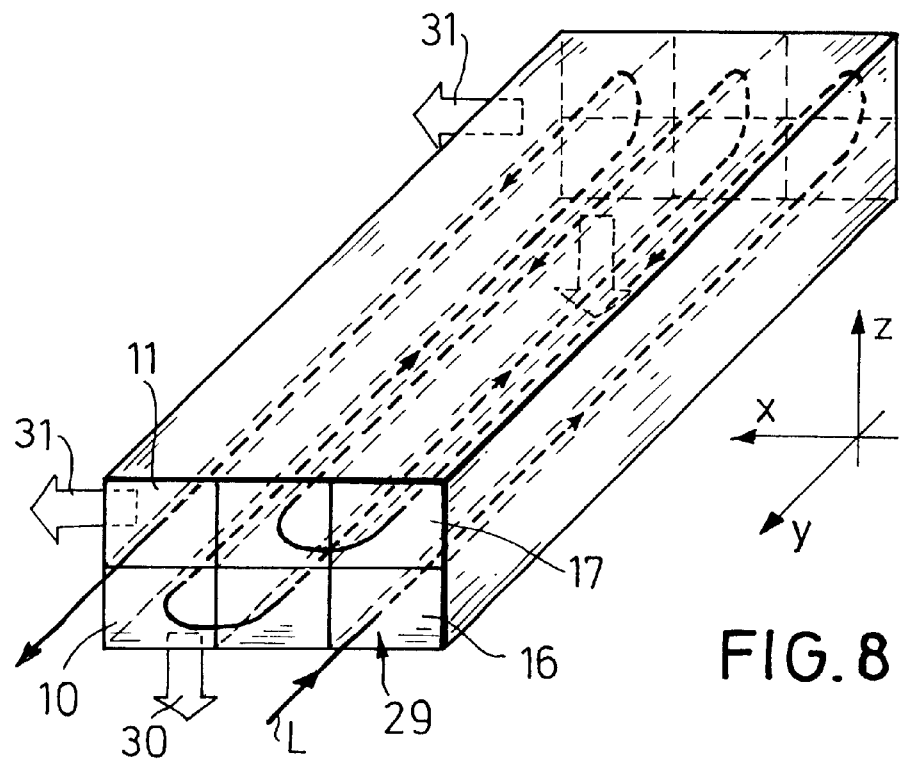
FIG. 8 is a perspective illustration of a basic air guiding action on the driver and passenger sides.
Figure 9:
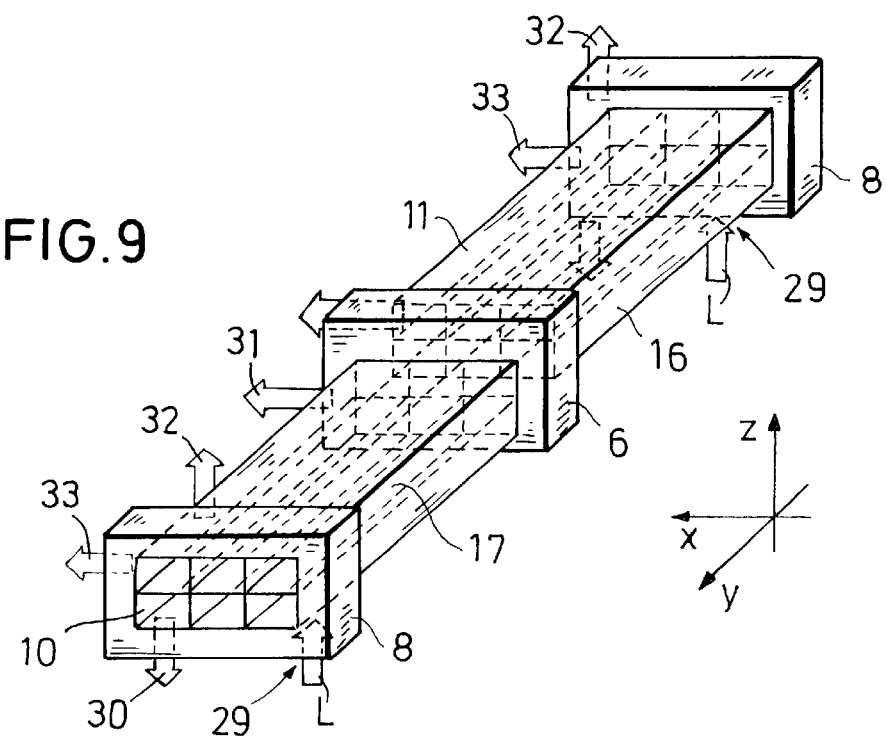
FIG. 9 is a schematic three-dimensional illustration of an instrument panel support showing where air enters and exits.

The basic flow of air L in the longitudinal portion 4 or 5 of the profiled support member 2 on the driver side or passenger side is shown in FIGS. 8 and 9. The air L enters the air guide system 3 via air inlets 29. It is shown that the air flow L is deflected multiple times within the air channels 10, 11; 16, 17 of the air guide system 3 arranged adjacent and atop one another and thus flows within different levels and vertical planes. Air outlets 30, 31; 32, 33 are provided for the leg room, the driver and passenger vents, the windshield, and side window defrosting system (see also FIG. 9).

Figure 10:
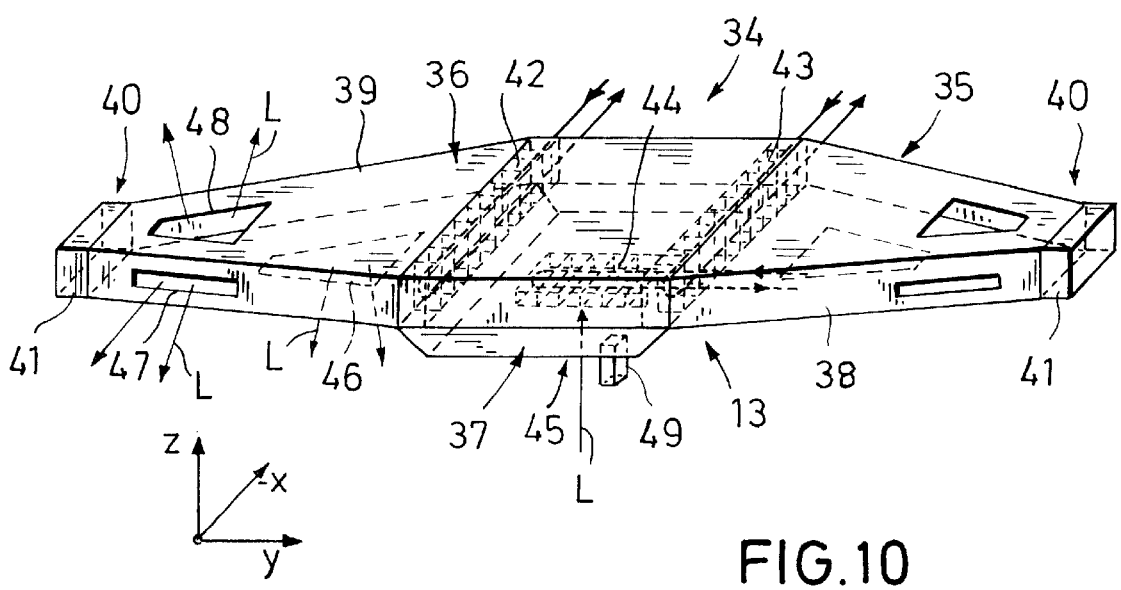
FIG. 10 shows a further embodiment of an instrument panel support according to the invention.

With the aid of FIG. 10 an instrument panel support 34 is illustrated in which the profiled support member 35 with integrated air guide system 36 has a compact center part 37 to which are connected at both sides trapezoidally configured longitudinal portions 38, 39. The free ends 40 of the longitudinal portions 38, 39 are arranged in the holders 41 of the A columns. In the center part 37 two heat exchangers 42, 43 of the heating system as well as a heat exchanger 44 of the cooling system are integrated. The heat exchangers 42 through 44 are components of the air conditioner 13 of the passenger car. The profiled support member 35 can be provided in the form of molded shells or single or multiple extruded profiled members. With a central air inlet 45 air is taken in and then guided across the heat exchangers 42, 43, 44. The air is then deflected in the center part 37 into the longitudinal portions 38, 39 of the air guide system 36 to the driver or passenger side. In this area air outlets 46 through 48 for the leg room, the driver and passenger vents, as well as the windshield and the side window defrosting system are provided. Depending on the operation, the air conditioning (heating, cooling) is realized independent of external effects and maintained.

For removing condensed water which is produced during operation, the air guide system 36 is provided in the center part 37 with a condensate discharge 49.

Figure 11:
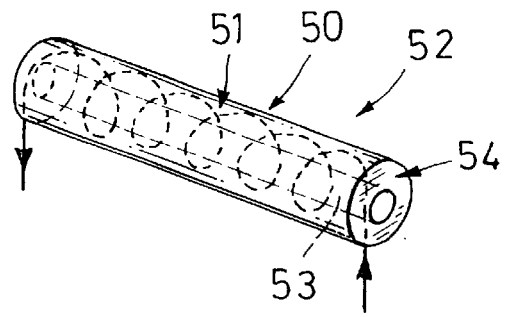
FIG. 11 shows a detail of the instrument panel support with air turbulence.

A detail of a profiled support member 50 with integrated air guide system 51 of a further embodiment of an instrument panel support 52 is illustrated in FIG. 11.

A heat exchanger conduit 53 is integrated centrally in the air guide system 51. Only schematically shown are means 54 for generating a spiral flow of the air L in a vortex about the heat exchanger conduit 53. This concept ensures a prolonged travel of the air in the air guide system ensuring an increased contact surface and contact time of the air with the heat exchanger conduit 53 and thus an improved heat exchange. In this embodiment it is also, in principle, possible to provide the heat exchanger conduit 53 with surface area-enlarging heat exchange surfaces.

Figure 12:
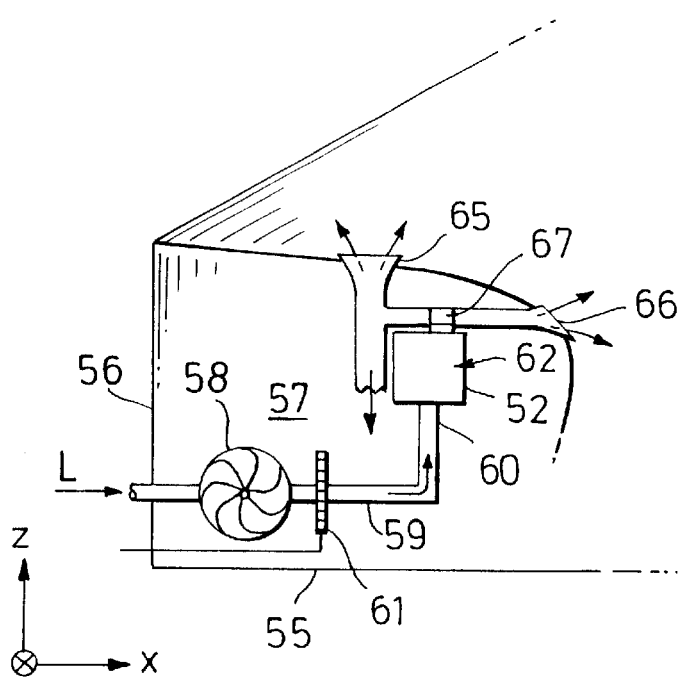
FIG. 12 shows a technically simplified overview illustration of the instrument panel area with instrument panel support in an embodiment according to FIG. 11 in a view in the x–z plane.
Figure 13:
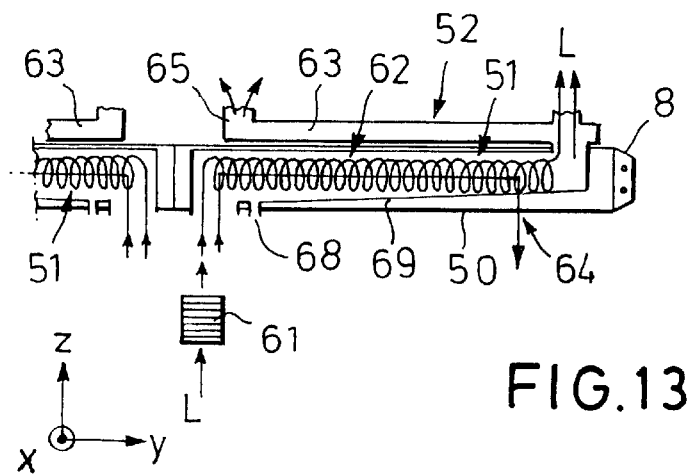
FIG. 13 shows the overview illustration according to FIG. 12 in the z–y plane.

In the representations according to FIGS. 12 and 13, reference numeral 55 indicates the car floor and 56 the end wall of the leg room 57. Air L is taken in by a fan 58 and is guided via the line 59 and the air inlet 60 into the instrument panel support 52. A first heat exchanger 61 is integrated into the conduit 59. This heat exchangers 61 is, for example, provided for heating purposes. A second heat exchanger 62 is integrated into the instrument panel support 52 and has, in particular, the configuration of the heat exchanger conduit 53, explained in connection with FIG. 11, through which a cooling medium flows. When the heat exchanger 61 is turned off, cooling of air L is realized by means of the heat exchanger 62 in the air guide system 51. The air-conditioned air L is guided by the air guide system 51 of the instrument panel support 50 via corresponding air channels 63 and air outlets 64 through 67 into the leg room, to the windshield, the driver and passenger vents, and the side window defrosting system.

Approximately at the lowest area of the air guide system 51 a condensate discharge 68 is provided. The proper flow of condensed water to the condensate discharge 68 is enhanced by the slantedly positioned bottom surface 69 of the air guide system 51.

While specific embodiments of the invention have been shown and described in detail to illustrate the inventive principles, it will be understood that the invention may be embodied otherwise without departing from such principles.

What is claimed is:

1. An instrument panel support configured to be positioned between windshield posts of a motor vehicle, the instrument panel support comprising a profiled support member with an integrated air guide system, wherein the profiled support member has at least one air inlet and at least one air outlet connected to the air guide system, wherein the air guide system is configured to form at least a portion of a heat exchanger of an air conditioner of the motor vehicle;

wherein the heat exchanger has heat exchanger conduits, carrying a heat exchanger medium;

wherein the air guide system is comprised of several longitudinal channels and wherein the heat exchanger conduits are configured to be integrated in the longitudinal channels;

wherein the heat exchanger conduits have surface-area increasing heat exchanger surfaces;

wherein the profiled support member comprises two longitudinal portions and a central coupling member connecting the two longitudinal portions; and wherein the profiled support member is configured to be moveably coupled to the windshield posts so as to be moveable relative to the windshield posts.

\* \* \* \* \*